United States Patent
Schröder et al.

(10) Patent No.: US 10,726,965 B2
(45) Date of Patent: Jul. 28, 2020

(54) CONTAMINATION-REPELLENT MIRROR AND METHOD FOR PRODUCING THE SAME

(71) Applicants: Fraunhofer-Gesellschaft zur Förderung der angewandten Forschung e.V., München (DE); Friedrich-Schiller-Universität Jena, Jena (DE)

(72) Inventors: Sven Schröder, Jena (DE); Nadja Felde, Jena (DE); Luisa Coriand, Jena (DE); Marcus Trost, Jena (DE); Gunther Notni, Jena (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 16/396,492

(22) Filed: Apr. 26, 2019

(65) Prior Publication Data

US 2019/0333655 A1    Oct. 31, 2019

(30) Foreign Application Priority Data

Apr. 27, 2018   (DE) .................. 10 2018 110 251

(51) Int. Cl.
 *G21K 1/06* (2006.01)
 *G02B 1/18* (2015.01)

(52) U.S. Cl.
 CPC .............. *G21K 1/062* (2013.01); *G02B 1/18* (2015.01)

(58) Field of Classification Search
 CPC ........ G02B 1/18; G02B 1/10; G02B 27/0006; G21K 1/062
 See application file for complete search history.

(56) References Cited

U.S. PATENT DOCUMENTS

| | | | |
|---|---|---|---|
| 9,301,382 B2 * | 3/2016 | Ershov | H05G 2/008 |
| 9,751,047 B2 * | 9/2017 | Lienhard | B01D 69/02 |
| 2008/0198457 A1 | 8/2008 | Sakai et al. | |
| 2010/0316842 A1 * | 12/2010 | Tuteja | D01D 5/003 428/143 |
| 2014/0211178 A1 * | 7/2014 | Ehm | G03F 7/70316 355/66 |

FOREIGN PATENT DOCUMENTS

| | | |
|---|---|---|
| DE | 102008009939 A1 | 9/2008 |
| DE | 102014112133 A | 2/2016 |
| JP | H101333 A | 1/1998 |
| JP | 2005321623 A | 11/2005 |
| JP | 2006208694 A | 8/2006 |
| JP | 2008233878 A | 10/2008 |
| JP | 2013171269 A | 9/2013 |

\* cited by examiner

*Primary Examiner* — Brooke Purinton
(74) *Attorney, Agent, or Firm* — Slater Matsil, LLP

(57) ABSTRACT

A contamination-repellent mirror and a method for producing the same. In an embodiment a contamination-repellent mirror includes a mirror layer disposed on a substrate, wherein the mirror layer has a reflection maximum in a wavelength range between 1 nm and 50 nm, a nanorough layer arranged on the mirror layer, wherein the nanorough layer has an rms roughness between 1 nm and 50 nm, and wherein a hygrophobic cover layer is arranged on the nanorough layer or the nanorough layer comprises a hygrophobic material.

17 Claims, 1 Drawing Sheet

CONTAMINATION-REPELLENT MIRROR AND METHOD FOR PRODUCING THE SAME

CROSS-REFERENCE TO RELATED APPLICATIONS

This application claims the priority of German patent application 102018110251.8, filed on Apr. 27, 2018, which application is hereby incorporated herein by reference.

TECHNICAL FIELD

The invention is related to a mirror, in particular to a mirror for radiation in the wavelength range from 1 nm to 50 nm, wherein the mirror has a contamination-repellent coating.

BACKGROUND

Optical components used under conditions where the optical surface is exposed to particles may be impaired or damaged in their function by the impacting particles.

This problem can occur especially with mirrors for extreme UV radiation (XUV radiation) or soft X-rays. The XUV spectral range covers the wavelength range from about 10 nm to about 50 nm. To smaller wavelengths, the soft X-ray region follows, which comprises wavelengths from 1 nm to 10 nm. Here and in the following, soft X-ray radiation and XUV radiation shall be understood to mean the wavelength range from 1 nm to 50 nm. Mirrors for XUV radiation or soft X-rays can be used, for example, in semiconductor manufacturing, materials analysis or astronomy.

Laser-induced plasmas, especially based on tin, are frequently used as radiation sources for the generation of soft X-rays or XUV radiation. For beam shaping, a collector mirror is usually arranged in the vicinity of such a radiation source. However, the generation of radiation by laser-induced plasmas not only generates radiation, but also emits particles known as debris. In laser-induced plasmas, debris occurs among other things in the form of minute particles, for example, in the form of tin particles in tin-based plasmas. Debris can contaminate or damage optical components. Due to the spatial proximity of the collector mirror to the plasma, the collector mirror is particularly affected by damage and contamination by debris.

SUMMARY

Embodiments provide protection of the mirror from debris. One approach is to deflect charged particles by magnetic fields in order to keep them away from the mirror surface. However, the magnetic fields only act on charged particles and it is not always possible to completely prevent impurities from hitting the mirror surface.

Embodiments provide a mirror that is as insensitive as possible to contamination and easy to clean. Further embodiments provide a method for manufacturing the mirror.

According to at least one embodiment, the contamination-repellent mirror comprises a mirror layer disposed on a substrate. A nanorough layer is arranged on the mirror layer, the nanorough layer having an rms roughness between 1 nm and 50 nm. Furthermore, a hygrophobic cover layer is arranged on the nanorough layer, or the nanorough layer comprises a hygrophobic material.

The nanorough layer arranged on the mirror layer and the hygrophobic cover layer arranged above it, or the nanorough layer formed from a hygrophobic material, have the advantage that impurities such as debris from plasma-based radiation sources roll off the surface or are at least easy to remove. This counteracts any impairment of the mirror's function due to contamination.

Depending on the application, the substrate of the mirror may be, for example, a semiconductor material, a metal, a glass or a glass ceramic. When the mirror is exposed to high temperatures, such as near a radiation source, the substrate is preferably made of a temperature resistant material. The substrate can be a flat substrate or a curved substrate.

The mirror layer can be a single layer or composed of several sublayers. Depending on the intended reflection wavelength, the mirror layer can be, for example, a metal layer or a dielectric multilayer system.

In a preferred embodiment, the mirror is a mirror for XUV radiation or soft X-rays. In particular, the mirror layer has a reflection maximum in the wavelength range between 1 nm and 50 nm. The mirror layer is preferably a multilayer mirror with a plurality of alternating first layers and second layers. In particular, the multilayer mirror may have a periodic arrangement of layer pairs each composed of a first layer and a second layer.

The materials of the first layer and the second layer may be selected in such a way that they exhibit the greatest possible difference in their optical constants in the wavelength range intended for use of the mirror. At least one of these materials should have the lowest possible absorption at the intended wavelength. The choice of materials for the layer sequence therefore depends primarily on the wavelength at which the mirror is to be used. In the XUV spectral range there is therefore an optimal material pairing for a certain wavelength range, usually only a few nanometers wide, which guarantees a high reflection due to the optical contrast of the layer materials.

Suitable material combinations for the XUV range and soft X-rays are known to experts and are therefore not explained in detail here. For example, multilayer mirrors based on the material combination molybdenum-silicon are frequently used for the wavelength of about 13.5 nm, which is particularly relevant in the XUV spectral range.

At perpendicular incidence, the period of the multilayer mirror, i.e., the thickness of a layer pair of a first layer and a second layer, is approximately $\lambda/2$, where $\lambda$ is the wavelength of the radiation. In particular, the mirror layer can be a multilayer mirror with a period in the range of 0.5 nm to 50 nm.

The contamination-repellent effect may be based on the roughness of the nanorough layer, the rms roughness of which is between 1 nm and 50 nm, and the hygrophobic cover layer arranged above it. It is also possible that the nanorough layer consists of a hygrophobic material. In this case, the hygrophobic cover layer can be dispensed with.

A particularly good contamination-repellent effect can be achieved if the rms roughness of the nanorough layer is at least 3 nm. Particularly preferred the roughness of the nanorough layer is at least 5 nm or even at least 10 nm. In contrast, mirror layers are usually produced with a very low roughness of less than 0.5 nm to achieve maximum reflection and avoid scattering.

The mirror according to the principle proposed here is based, among other things, on the insight that the nanorough layer above the mirror layer, despite its comparatively high roughness, does not significantly increase the scattering of radiation and also does not significantly reduce reflection.

This is particularly the case for a multilayer mirror for soft X-rays or XUV radiation, because the refractive index difference to the ambient medium is not very large due to the low refractive indices in this spectral range.

The nanorough layer may have a thickness of less than 300 nm, preferably of less than 200 nm and particularly of less than 100 nm. The thickness of the nanorough layer is preferably chosen so that it is not significantly thicker than required to form the roughness structure. A lower limit for the thickness of the nanorough layer results from the roughness to be adjusted. Depending on the desired roughness, the thickness of the nanorough layer can, for example, be more than 3 nm, more than 10 nm or more than 50 nm.

According to at least one embodiment, the nanorough layer is an oxide layer or a fluoride layer. Suitable materials for the nanorough layer are in particular $Al_2O_3$, $SiO_2$, $MgF_2$, $AlF_3$ and $LaF_3$. The nanorough coating is preferably applied by a sol-gel process. Alternatively, other coating processes are also suitable, in particular wet chemical coating processes such as dip coating, rotary coating, doctor blade coating or spraying. The nanorough layer can, for example, be produced from an aqueous or alcoholic base (e.g., isopropanol). Vacuum coating processes such as sputtering are also suitable.

In a preferred configuration, the nanorough layer is an $Al_2O_3$ layer. An $Al_2O_3$ layer can be given a roughness structure in a comparatively simple way by a thermal post-treatment step in aqueous solution.

The hygrophobic cover layer may contain a fluoropolymer. The hygrophobic cover layer is characterized by its hygrophobic effect, i.e., its liquid-repellent property, and is preferably at the same time as insensitive to temperature as far as possible, in order to be used in particular in the immediate vicinity of an XUV radiation source. Perfluoropolyether (PFPE) and fluoroalkyltrimethoxysilane (FAS) are particularly suitable materials for the hygrophobic cover layer. Alternatively, it is possible that the nanorough layer itself is formed from one of the hygrophobic materials mentioned here.

The hygrophobic cover layer is preferably so thin that it covers the nanorough layer essentially conformally, i.e., the roughness structure at least does not change significantly. In particular, the nanorough layer is not leveled by the hygrophobic cover layer. The thickness of the hygrophobic cover layer is preferably between 0.1 nm and 20 nm, preferably between 1 nm and 10 nm.

In a process for manufacturing a mirror according to embodiments, the mirror layer is applied to a substrate, subsequently the nanorough layer is applied to the mirror layer and then the hygrophobic cover layer is applied to the nanorough layer. Alternatively, the nanorough layer can be produced from hygrophobic material. In this case the hygrophobic cover layer is not necessary. It is possible that the nanorough layer is first deposited as a smooth layer on the mirror layer and then roughened by post-treatment. The roughening can, for example, be carried out by an etching process, in particular by a wet chemical etching process or a dry etching process.

In a preferred configuration, the nanorough layer is roughened by a wet chemical etching process. For example, the nanorough layer can be an $Al_2O_3$ layer that can be produced using a sol-gel process in particular. In this case, a nanostructure can be created on the surface by post-treatment in aqueous solution at elevated temperature.

The above-mentioned configurations of the mirror also apply to the process and vice versa.

BRIEF DESCRIPTION OF THE DRAWINGS

In the following, the invention will be explained in more detail using examples in connection with FIGS. 1 and 2.

In the figures.

Same or similarly acting components are provided in the figures with the same reference signs in each case. The components shown as well as the proportions of the components among each other are not to be regarded as true to scale.

DETAILED DESCRIPTION OF ILLUSTRATIVE EMBODIMENTS

Figure 1:
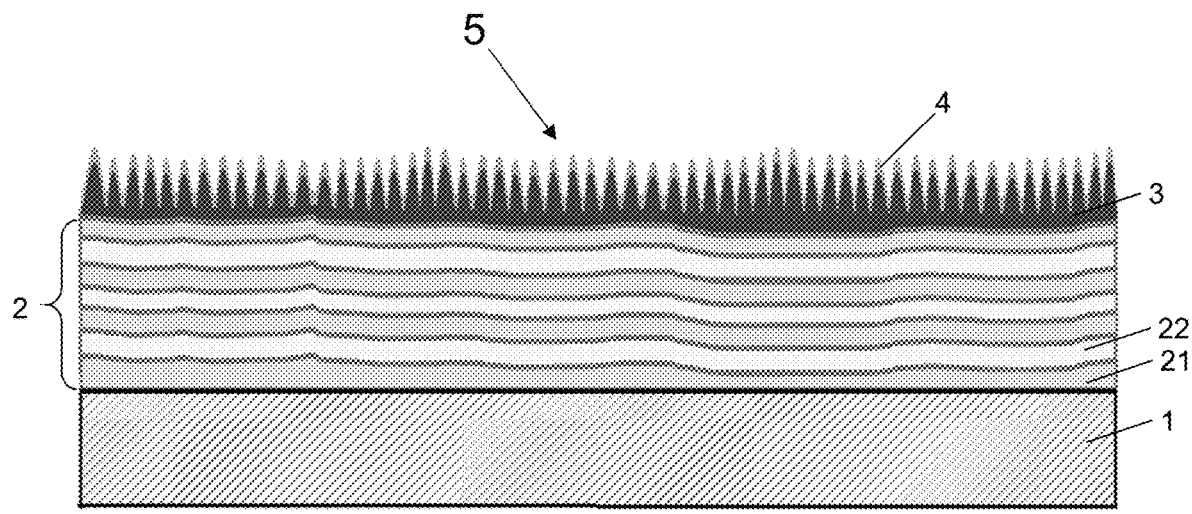
FIG. 1 shows a schematic representation of a contamination-repellent mirror according to an example.

The mirror 5 shown in FIG. 1 according to an example shows a substrate 1 with a mirror layer 2 applied to it. In the example, substrate 1 is a metal substrate and consists of nickel. The mirror layer 2 is a multilayer mirror with a plurality of thin film pairs 21, 22.

The mirror is used in the example for the reflection of XUV radiation at a wavelength of $\lambda=13.5$ nm. This wavelength is intended in particular for the lithographic production of semiconductor chips.

The mirror has a total of 60 periods of alternating silicon layers 21 and molybdenum layers 22 (for simplification not all periods are shown in FIG. 1). The silicon layers 21 in the example have a thickness of 40.28 nm and the molybdenum layers 22 a thickness of 2.63 nm.

Tin-based plasmas are particularly suitable as radiation sources for XUV radiation. During operation of such radiation sources, however, debris in the form of tin droplets may occur. The mirror 5 according to the example shown here has therefore been coated with a contamination-repellent coating to prevent tin droplets from adhering to the surface of the mirror 5.

For this purpose, a nanorough layer 3 with a thickness of 250 nm has been applied to mirror layer 2. The nanorough layer 3 in the example is an $Al_2O_3$ layer that has been roughened by post-treatment in aqueous solution. The $Al_2O_3$3 layer 3 can be roughened in particular by post-treatment in aqueous solution at elevated temperature. Depending on the treatment time, the roughness of the nanorough layer 3 can be specifically adjusted. The treatment time is in particular at least 5 s, preferably more than 30 s. In this wet chemical etching process, the characteristic roughness structure is formed in the nanometer range.

In the example, a hygrophobic layer 4 is applied to the nanorough layer 3 produced in this way. The hygrophobic layer 4 is a perfluoropolyether (PFPE) layer with a thickness of 8 nm, for example. The combination of the nanorough layer 3 and the hygrophobic layer 4 advantageously changes the wetting properties of the mirror 5 in such a way that contaminations such as tin debris do not adhere to the surface. The mirror is therefore comparatively insensitive to contamination by debris and is advantageously easy to clean.

Figure 2:
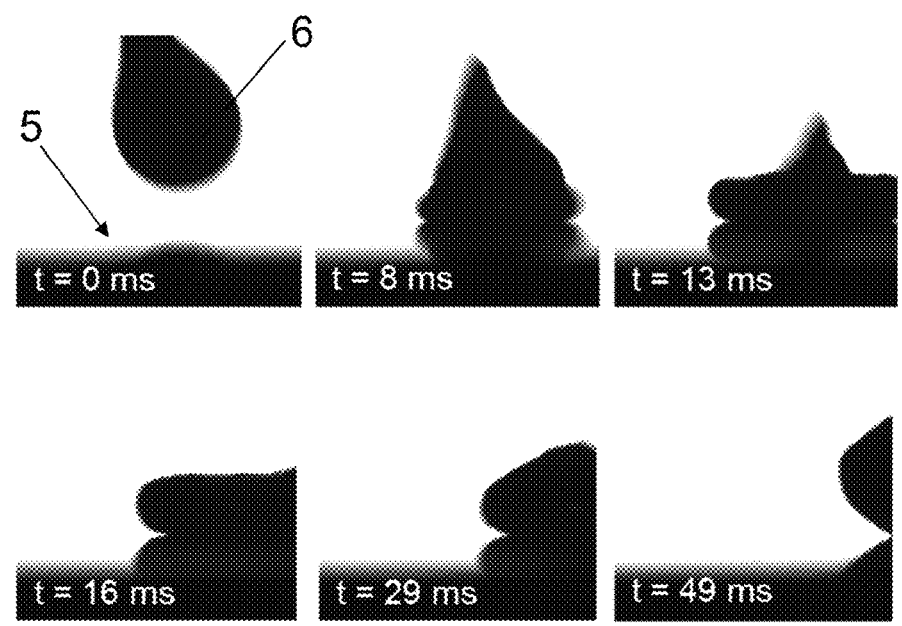
FIG. 2 shows a schematic representation of the unrolling of a tin drop from an example of the mirror.

FIG. 2 shows a roll-off test of a tin drop from a surface functionalized as in the example of FIG. 1. During the experiment, the mirror surface was inclined by 20° and had a temperature of 390° C. The diagram shows the rolling of a tin droplet with a temperature of 250° C. at various times in the range from 0 ms to 49 ms. It shows that the drop rolls off on impact with the surface and does not adhere to the surface. The contamination-repellent coating also has the advantage that tin or other impurities detach from the surface in the cooled state without applying any mechanical force. The contamination-repellent coating described herein increases the service life of mirrors, especially XUV mirrors, and simplifies their cleaning. This is achieved without a significant increase in scattering losses.

The invention is not limited by the description of the examples. Rather, the invention includes any new feature and any combination of features, which in particular includes any combination of features in the claims, even if that feature or combination itself is not explicitly mentioned in the claims or examples.

What is claimed is:

1. A contamination-repellent mirror for XUV radiation or soft X-rays comprising:
    a mirror layer disposed on a substrate, wherein the mirror layer has a reflection maximum in a wavelength range between 1 nm and 50 nm; and
    a nanorough layer arranged on the mirror layer, wherein the nanorough layer has an rms roughness between 1 nm and 50 nm, and
    wherein a hygrophobic cover layer is arranged on the nanorough layer or the nanorough layer comprises a hygrophobic material.

2. The contamination-repellent mirror according to claim 1, wherein the mirror layer is a multilayer mirror comprising a plurality of alternating first layers and second layers.

3. The contamination-repellent mirror according to claim 1, wherein the nanorough layer has an rms roughness of at least 3 nm.

4. The contamination-repellent mirror according to claim 1, wherein the nanorough layer has an rms roughness of at least 5 nm.

5. The contamination-repellent mirror according to claim 1, wherein the nanorough layer has a thickness of less than 300 nm.

6. The contamination-repellent mirror according to claim 1, wherein the nanorough layer is an oxide layer or a fluoride layer.

7. The contamination-repellent mirror according to claim 1, wherein the nanorough layer comprises $Al_2O_3$.

8. The contamination-repellent mirror according to claim 1, wherein the hygrophobic cover layer comprises a fluoropolymer.

9. The contamination-repellent mirror according to claim 1, wherein the hygrophobic cover layer has a thickness between 0.1 nm and 20 nm.

10. A method for producing a contamination-repellent mirror for XUV radiation or soft X-rays, the method comprising:
    applying a mirror layer to a substrate, the mirror layer having a reflection maximum in a wavelength range between 1 nm and 50 nm; and
    applying a nanorough layer to the mirror layer,
    wherein a hygrophobic cover layer is applied to the nanorough layer or the nanorough layer comprises a hygrophobic material.

11. The method according to claim 10, wherein the nanorough layer is applied to the mirror layer by a sol-gel method.

12. The method according to claim 10, wherein the nanorough layer comprises $Al_2O_3$.

13. The method according to claim 12, wherein the nanorough layer is roughened by a thermal treatment.

14. A contamination-repellent mirror for XUV radiation or soft X-rays comprising:
    a mirror layer disposed on a substrate, wherein the mirror layer has a reflection maximum in a wavelength range between 1 nm and 50 nm; and
    a nanorough layer arranged on the mirror layer,
    wherein the nanorough layer has an rms roughness between 1 nm and 50 nm,
    wherein a hygrophobic cover layer is arranged on the nanorough layer or the nanorough layer comprises a hygrophobic material,
    wherein the nanorough layer has an rms roughness of at least 5 nm, and
    wherein the hygrophobic cover layer comprises a fluoropolymer.

15. The contamination-repellent mirror according to claim 14, wherein the mirror layer is a multilayer mirror comprising a plurality of alternating first layers and second layers.

16. The contamination-repellent mirror according to claim 14, wherein the nanorough layer has a thickness of less than 300 nm.

17. The contamination-repellent mirror according to claim 16, wherein the hygrophobic cover layer has a thickness between 0.1 nm and 20 nm.

* * * * *